(12) United States Patent
El Masalme et al.

(10) Patent No.: US 11,592,181 B2
(45) Date of Patent: Feb. 28, 2023

(54) FLOW PASSAGES FORMED IN A FLAME TUBE FOR A GAS TURBINE COMBUSTOR CHAMBER

(71) Applicant: MAN Energy Solutions SE, Augsburg (DE)

(72) Inventors: Jaman El Masalme, Hamminkeln (DE); Stefan Clauss, Duisburg (DE); Jan-Niklas Bleyl, Essen (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 457 days.

(21) Appl. No.: 16/576,099

(22) Filed: Sep. 19, 2019

(65) Prior Publication Data
US 2020/0124283 A1   Apr. 23, 2020

(30) Foreign Application Priority Data

Oct. 17, 2018  (DE) .......................... 102018125698.1

(51) Int. Cl.
*F23R 3/44* (2006.01)
*F23R 3/06* (2006.01)
(Continued)

(52) U.S. Cl.
CPC .................. *F23R 3/44* (2013.01); *F23R 3/04* (2013.01); *F23R 3/06* (2013.01); *F23R 3/286* (2013.01);
(Continued)

(58) Field of Classification Search
CPC .... F23R 3/04; F23R 3/286; F23R 3/44; F23R 2900/03043; F23R 3/06; F23R 3/10; F23R 900/00012; F02C 3/14
See application file for complete search history.

(56) References Cited

U.S. PATENT DOCUMENTS

| 4,085,581 A | 4/1978 | Caruel et al. |
| 4,365,470 A | 12/1982 | Matthews et al. |

(Continued)

FOREIGN PATENT DOCUMENTS

| CN | 101000145 | 7/2007 |
| CN | 104781610 | 7/2015 |

(Continued)

OTHER PUBLICATIONS

Office Action dated Apr. 7, 2020 issued in Sweden Patent Application No. 1930322-1.

(Continued)

*Primary Examiner* — Katheryn A Malatek
*Assistant Examiner* — Jingchen Liu
(74) *Attorney, Agent, or Firm* — Cozen O'Connor

(57) ABSTRACT

A gas turbine combustion chamber, having a combustion chamber housing, a burner positioned at least partially in the combustion chamber housing and a flame tube positioned in the combustion chamber housing. An upstream end of the flame tube has a flame tube cover. In the region of the flame tube cover radially inside the flame tube cover a mixing tube of the burner extends, which defines a pre-primary combustion zone. Between the mixing tube of the burner and the flame tube cover an axial air flow passage is formed, via which air can be conducted in the axial direction outside along the mixing tube, and into the flame tube cover radial air flow passages are introduced via which the air following the axial air flow passage can be conducted in the radial direction of the flame tube cover for cooling the flame tube cover.

12 Claims, 2 Drawing Sheets

(51) Int. Cl.
*F23R 3/04* (2006.01)
*B33Y 80/00* (2015.01)
*F23R 3/28* (2006.01)

(52) U.S. Cl.
CPC ..... *B33Y 80/00* (2014.12); *F23R 2900/03043* (2013.01)

(56) References Cited

U.S. PATENT DOCUMENTS

| | | | |
|---|---|---|---|
| 4,843,825 A | 7/1989 | Clark | |
| 5,329,761 A | 7/1994 | Ablett et al. | |
| 5,353,587 A * | 10/1994 | Halila | F23R 3/002 60/756 |
| 5,396,759 A | 3/1995 | Richardson | |
| 10,267,521 B2 | 4/2019 | Papple et al. | |
| 10,330,204 B2 * | 6/2019 | Clemen | F16J 15/44 |
| 2015/0292743 A1 * | 10/2015 | Mook | F02C 7/18 29/889.22 |
| 2016/0298841 A1 | 10/2016 | Papple et al. | |
| 2017/0167728 A1 * | 6/2017 | Gonyou | F23R 3/002 |
| 2018/0171953 A1 | 6/2018 | Wilson et al. | |
| 2018/0179956 A1 * | 6/2018 | Wertz | F23R 3/002 |
| 2019/0086088 A1 * | 3/2019 | Stevens | F23R 3/50 |

FOREIGN PATENT DOCUMENTS

| | | |
|---|---|---|
| CN | 204648319 U | 9/2015 |
| CN | 107735617 | 2/2018 |
| DE | 19508111 | 9/1996 |
| DE | 102006042124 | 3/2008 |
| DE | 102016212649 | 1/2018 |
| FR | 2996598 | 4/2014 |
| JP | 56-168040 | 12/1981 |
| JP | H 05-187636 | 7/1993 |
| JP | 2002-195564 | 7/2002 |
| JP | 2004-060623 | 2/2004 |

OTHER PUBLICATIONS

Search Report dated Apr. 9, 2020 issued in Great Britain Patent Application No. 1914751.1.
Search Report dated Jul. 18, 2019 issued in German Patent Application No. 102018125698.1.
Office Action dated Nov. 29, 2021 issued in Great Britain Patent Application No. GB1914751.1.
Chinese Office Action dated Mar. 18, 2022 issued in Chinese Patent Application No. 201910987231.9.
Office Action dated Oct. 14, 2022 issued in Chinese Patent Application No. 201910987231.9.
Office Action dated Dec. 12, 2022 issued in Japanese Patent Application No. 2019-165141.

* cited by examiner

FLOW PASSAGES FORMED IN A FLAME TUBE FOR A GAS TURBINE COMBUSTOR CHAMBER

BACKGROUND OF INVENTION

1. Field of the Invention

The invention relates to a gas turbine combustion chamber.

2. Description of Related Art

From DE 10 2006 042 124 A1 discloses a gas turbine combustion chamber having a combustion chamber housing, a burner that is at least positioned in portions in the combustion chamber housing, and a flame tube positioned in the combustion chamber housing. Of the burner, a so-called swirl generator is provided, via which fuel and air can be mixed in order to feed a mixture of fuel and air to the flame tube. On the upstream end of the flame tube a so-called flame tube cover is positioned. In the region of the flame tube cover there extends, radially inside adjoining the flame tube cover, a mixing tube of the burner that defines a pre-primary combustion zone of the gas turbine combustion chamber at least in portions. This pre-primary combustion zone of the gas turbine combustion chamber is followed by a primary combustion zone of the gas turbine combustion chamber, which is defined by the flame tube.

In the gas turbine combustion chamber known from DE 10 2006 042 124 A1, the combustion chamber housing forms a so-called baffle grid with multiple openings, through which compressed air flows and for the cooling strikes the flame tube. The cooling of the flame tube increases the lifespan of the gas turbine combustion chamber.

SUMMARY OF THE INVENTION

There is a need for improving cooling of assemblies of the gas turbine combustion chamber to further increase the lifespan of the same.

According to one aspect of the present invention a gas turbine combustion chamber is disclosed. The gas turbine combustion chamber according to one aspect of the invention comprises a combustion chamber housing, a burner positioned in the combustion chamber housing, at least in portions, and a flame tube that is positioned in the combustion chamber housing, which defines a primary combustion zone of the gas turbine combustion chamber. On an upstream end of the flame tube a flame tube cover is positioned. Radially inside adjoining the flame tube cover, a mixing tube of the burner extends in the region of the flame tube cover. The mixing tube defines a pre-primary combustion zone of the gas turbine combustion chamber at least in portions. Between the mixing tube of the burner and the flame tube cover an axial air flow passage is formed for cooling the mixing tube air via the axial direction outside along the mixing tube. In the flame tube cover, radial air flow passages are introduced via which the air following the axial air flow duct can be conducted in the radial direction of the flame tube cover for cooling the flame tube cover.

The gas turbine combustion chamber has an entirely new kind of cooling concept. Between the mixing tube of the burner, which defines the pre-primary combustion zone of the gas turbine combustion chamber at least in portions, and a portion of the flame tube cover, which radially extends outside at least in portions about the mixing tube, an axial air flow passage is formed. For cooling the mixing tube, air flows via this axial air flow passage in the axial direction outside along the mixing tube. Radial air flow passages are introduced into the flame tube cover. Air, which flows via the axial air flow passage, enters the radial air flow passages following the axial air flow passage for cooling the flame tube cover in order to be conducted in the radial direction through the flame tube cover for cooling the same. By way of this, not only an effective cooling of mixing tube and flame tube can be ensured, but also a low air quantity required for the cooling.

Preferentially, inlet openings of the radial air flow passages are formed on a radially inner lateral surface of the flame tube cover via which the air passes from the axial air flow passage into the radial air flow passages. On an axial surface of the flame tube cover facing the primary combustion zone, outlet openings of the radial air flow passages are formed in a radially outer portion of the axial surface, via which the air exits the radial air flow passages and enters the primary combustion zone. The radial air flow passages extend between the radially inner inlet openings of the same and the radially outer outlet openings of the same within the flame tube cover. This configuration is advantageous. By way of the inlet openings of the radial air flow passages, which are formed on the inner lateral surface of the flame tube cover, namely on the radially inner lateral surface of the specific portion of the flame tube cover, which extends radially outside about the mixing tube, the air, emanating from the axial air flow passage, can enter the radial air flow passages in a defined manner. By way of the outlet openings formed on the axial surface of the flame tube cover, heated air ultimately enters the primary combustion zone of the gas turbine combustion chamber defined by the flame tube, namely a region that is distant from a flame as a result of which a CO emission can be reduced. The radial air flow passages extend between the inlet openings and the outlet openings in the radial direction and, via the radial extent of the flame tube cover, make possible an effective cooling of the same.

Preferentially, a seal is positioned on a downstream end of the axial air flow passage between the mixing tube and the flame tube cover. By way of the seal it is ensured that the air, conducted via the axial air flow passage, is conducted via the radial air flow passages and not past the same emanating from the axial air flow passage directly into the primary combustion zone.

According to an advantageous further development, the burner comprises an inlet ring via which air enters the axial air flow passage formed between the mixing tube of the burner and the flame tube cover, namely in the radial direction via radial openings of the inlet ring. By way of this, the air can be fed to the axial air flow passage in a defined manner.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
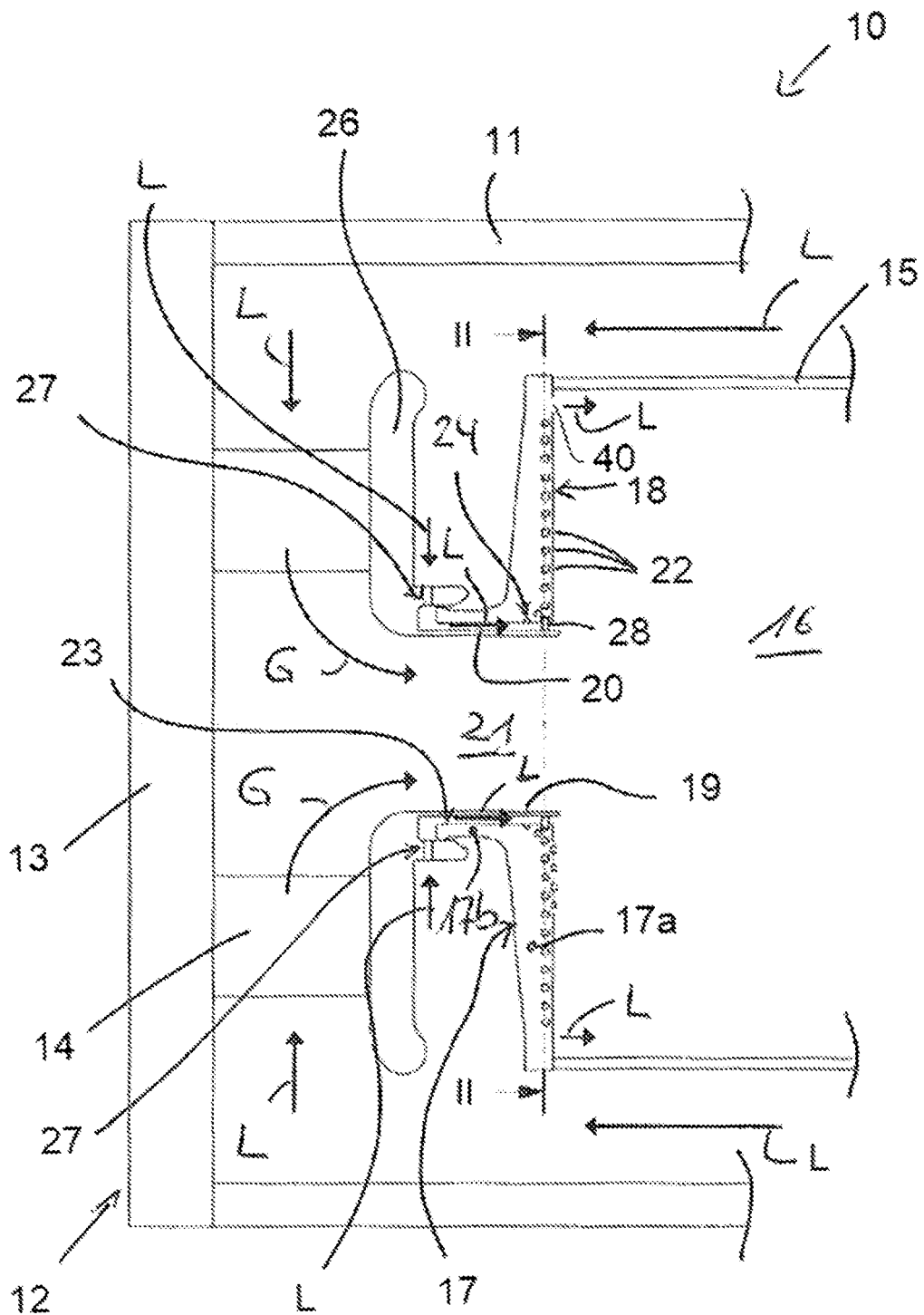
FIG. 1 is an extract from a gas turbine chamber according to the invention.

FIG. 1 shows a schematized cross section by way of an extract of a gas turbine combustion chamber 10 according to one aspect of the invention.

The gas turbine combustion chamber 10 comprises a combustion chamber housing 11, which can also include the baffle grid. In the combustion chamber housing 11, a burner 12 is arranged at least in portions, wherein a burner lid 13 and a swirl generator 14 of the burner 12 are shown. In the swirl generator 14, air and fuel are mixed in order to provide a mixture G of fuel and air.

In the combustion chamber housing 11, a flame tube 15 is arranged furthermore. The flame tube 15 defines a primary combustion zone 16 of the combustion chamber 10. On the upstream end of the flame tube 15, a flame tube cover 17 is positioned. The flame tube cover 17 essentially comprises two portions 17a, 17b.

The portion 17a is a plate-shaped portion, which has an axial surface 18 facing the primary combustion zone 16. The portion 17b is a tubular portion into which a mixing tube 19 of the burner 12 extends. The portion 17b of the flame tube cover 17 surrounds the mixing tube 19 of the burner 12 radially outside at least in portions.

Between the mixing tube 19 and the portion 17b of the flame tube cover 17 an axial air flow passage 20 is formed, through which for cooling the mixing tube 19 air L is conducted in the axial direction along the mixing tube 19. An arrow extending within this axial air flow passage 20 illustrates the flow of the air L in the axial direction through the axial air flow passage 20 outside along the mixing tube 19.

The mixing tube 19 of the burner 12 defines a so-called pre-primary combustion zone 21 of the gas turbine combustion chamber 10 at least in portions, which is arranged upstream of the primary combustion zone 16 of the gas turbine combustion chamber 10.

In the flame tube cover 17, namely in the portion 17a of the flame tube cover 17, radial air flow passages 22 are introduced. Air L, which flows via the axial air flow passage 20 for cooling the mixing tube 19, following the axial air flow passage 20, flows for cooling the flame tube cover 17, namely of the portion 17a of the flame tube cover 17, in the radial direction through the flame tube cover 17 via the radial air flow passages 22, which emanating from a radially inner portion of the flame tube cover 17 extend in the direction of a radially outer portion of the flame tube cover 17, namely according to FIG. 2 preferably curved or bent or spiral.

As is evident from FIG. 1, inlet openings 24 of the radial air flow passages 22 are formed on a radially inner lateral surface 23 of the flame tube cover 17, namely of the portion 17b of the flame tube cover 17, via which the air L passes from the axial air flow passage 20 into the radial air flow passages 22. On the axial surface 18 of the flame tube cover 17 facing the primary combustion zone 16, namely of the portion 17a of the flame tube cover 17, outlet openings 40 of the radial air flow passages 22 are formed. By way of these outlet openings, air L conducted via the radial air flow passages 22 exits the radial air flow passages 22 and enters the primary combustion zone 16 of the combustion chamber 10, wherein in FIG. 1 arrows show the air L exiting from the outlet openings of the radial air flow passages 22. Accordingly, the air flows out of the flame tube cover 17 radially outside adjacent to the flame tube 15, i.e. in a region of the primary combustion zone 16 that is distant from a flame. This has a positive influence on the CO emission. The CO emission can be reduced.

The radial air flow passages 22, which emanating from the axial air flow passage 20 extend in the direction of the outlet openings, extend within the portion 17a of the flame tube cover 17 and, between the radially inner inlet openings 24 and the radially outer outlet openings are designed closed. As already explained, the radial air flow passages 22 according to FIG. 2 preferentially follow a bent or spiral course. The air, which at first flows via the axial air flow passage 20 between the mixing tube 19 and the portion 17b of the flame tube 17 and following this via the radial air flow passages 22 of the portion 17a of the flame tube cover 17, enters the axial air flow passage 20 via an inlet ring 26 of the burner 12.

The inlet ring 26 has radial openings 27 via which the air L enters the axial air flow passage 20 in the direction of the arrow that is visible in FIG. 1 via the radial openings 27 of the inlet ring 26. This occurs on the upstream end of the axial air flow passage 20.

On the downstream end of the axial air flow passage 20 a seal 28 is positioned via which the axial air flow passage 20 is sealed on its downstream end. By way of this it is ensured that the air, which initially leads via the axial air flow passage 20, enters the radial air flow passages 22 and does not flow directly into the primary combustion zone 16 but only in particular when the air following the axial air flow passage 20 has also flowed via the radial air flow passages 22.

The seal 28 is preferentially a piston ring seal.

Figure 2:
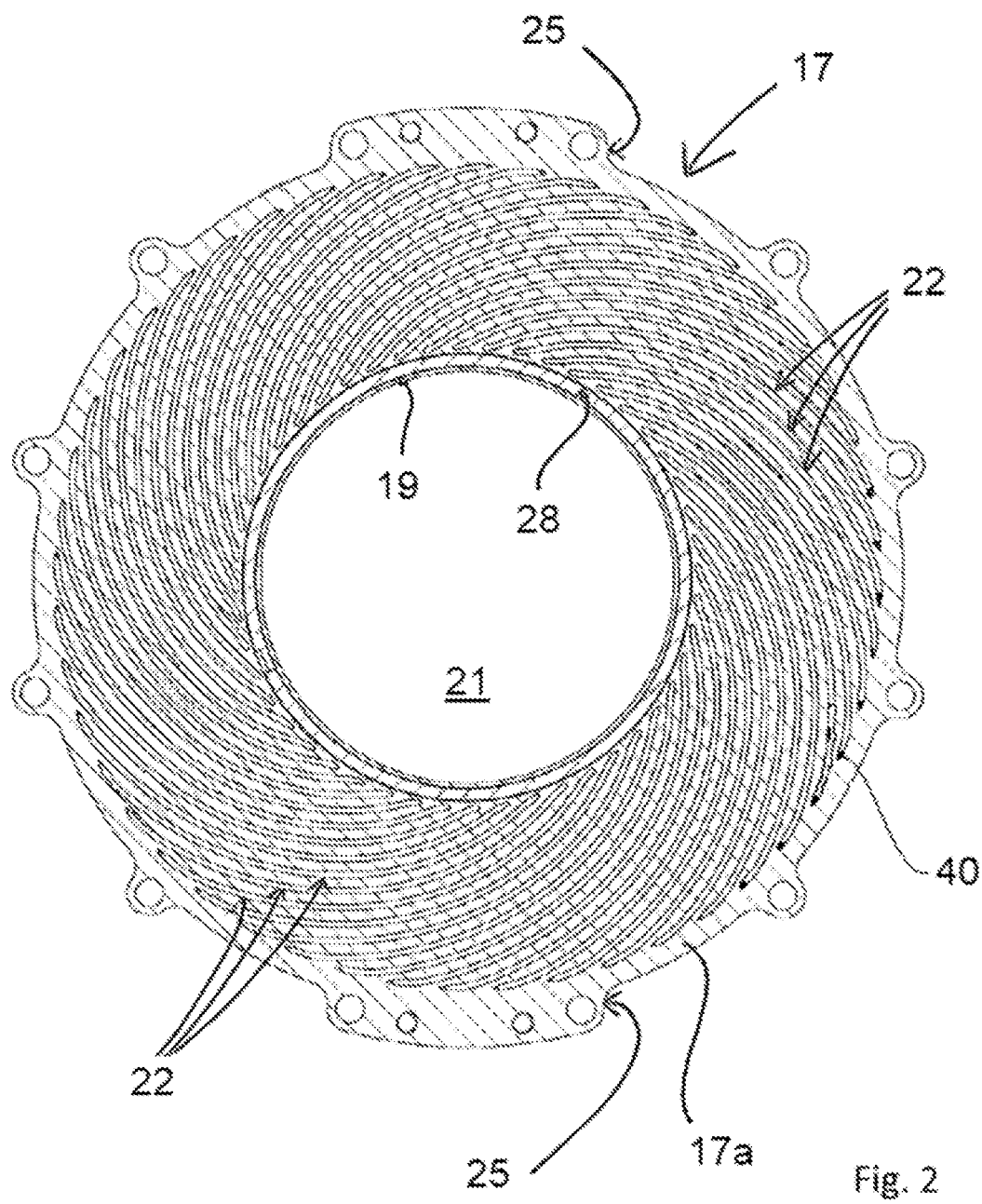
FIG. 2 is the cross section II-II of FIG. 1.

FIG. 2 shows the cross section II-II through the flame tube cover 17, namely through the portion 17a of the flame tube cover 17, wherein this cross section extends through the radial air flow passages 22 and through the seal 28 and the adjoining portion of the mixing tube 19. The bent course of the radial air flow passages 22 is evident from FIG. 2, which extend from radially inside to radially outside via the portion 17a of the flame tube cover 17. Radially outside adjoining the radial air flow passages 22 a flange portion 25 is formed on the portion 17a of the flame tube cover 17, via which the flame tube cover 17 can be screwed to the flame tube 15.

The flame tube cover 17 is preferentially a component produced by way of a generative manufacturing method, namely via 3D printing. In the generative manufacturing method, for example laser based powder bed fusion, LBM (laser beam melting) or SLM (selective laser melting)) can be employed.

According to one aspect of the invention, air that serves for the cooling of the mixing tube 19 is accordingly also conducted through the flame tube cover 17 in order to also cool the flame tube cover 17 following the mixing tube 19. Accordingly, one and the same air is utilized for cooling the mixing tube 19 and the flame tube cover 17. By way of this, an effective cooling can be ensured with a relatively low quantity of air. In addition, the more of air to the burner results in a NOx reduction.

By way of the defined air conduction the CO emission can be reduced. The air, which was conducted via the axial air flow passage 20 and the radial air flow passages 22 flows in a radially outer portion of the flame tube cover 17 out of the same and accordingly into the primary combustion zone 16 in a radially outer portion, i.e. spaced apart from the flame, as a result of which the CO emission can be reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A gas turbine combustion chamber, comprising:
   a combustion chamber housing;
   a burner positioned in the combustion chamber housing at least in portions;
   a flame tube positioned in the combustion chamber housing, that contains a primary combustion zone,
   a flame tube cover is positioned on an upstream end of the flame tube comprising a tubular portion and a plate-shaped portion, such that a downstream face of the plate-shaped portion of the flame tube cover directly faces the primary combustion zone;
   a mixing tube of the burner extends in a radially central region of the flame tube cover, and adjoining the flame tube cover which at least in portions defines a pre-primary combustion zone;
   an inlet ring of the burner has a projecting portion adjacent the tubular portion of the flame tube cover, wherein radial openings are formed on the projecting portion of the inlet ring, air enters an axial air flow passage in a radial direction of the flame tube cover through the radial openings, and;
   the axial air flow passage is defined by the mixing tube of the burner and the tubular portion of the flame tube cover configured for the air to flow in an axial direction along the mixing tube for cooling the mixing tube; and
   wherein the air flows from the axial air flow passage into radial air flow passages formed in the plate-shaped portion of the flame tube cover, the air is conducted in the radial direction of the flame tube cover for cooling the flame tube cover, and the plate-shaped portion of the flame tube cover extends radially between the mixing tube and the flame tube.

2. The gas turbine combustion chamber according to claim 1, further comprising inlet openings of the radial air flow passages are formed on a radially inner lateral surface of the flame tube cover via which the air flowing from the axial air flow passage enters the radial air flow passages.

3. The gas turbine combustion chamber according to claim 2, further comprising:
   outlet openings of the radial air flow passages are formed on the downstream face of the plate-shaped portion of the flame tube cover via which the air exits the radial air flow passages and enters the primary combustion zone.

4. The gas turbine combustion chamber according to claim 3, wherein the outlet openings of the radial air flow passages are formed on a radially outer portion of the downstream face of the plate-shaped portion of the flame tube cover.

5. The gas turbine combustion chamber according to claim 3, wherein each of the radial air flow passage extends between each of the inlet opening and each of the outlet opening within the plate-shaped portion of the flame tube cover.

6. The gas turbine combustion chamber according to claim 3, wherein each of the radial air flow passage extends continuously from each of the inlet opening and each of the outlet opening.

7. The gas turbine combustion chamber according to claim 3, wherein each of the radial air flow passage between each of the inlet opening and each of the outlet opening follows a curved or spiral course.

8. The gas turbine combustion chamber according to claim 1, wherein a seal is positioned on a downward end of the axial air flow passage between the mixing tube and the flame tube cover.

9. The gas turbine combustion chamber according to claim 1, wherein the flame tube cover is produced by way of a generative manufacturing method.

10. The gas turbine combustion chamber according to claim 9, wherein the generative manufacturing method is 3D printing.

11. The gas turbine combustion chamber according to claim 1, wherein an entire perimeter of a cross section of each of the radial air flow passage is bounded by the plate-shaped portion of the flame tube cover.

12. The gas turbine combustion chamber according to claim 1, wherein the primary combustion zone is radially bounded by the flame tube and axially bounded by the downstream face of the plate-shaped portion of the flame tube cover.

* * * * *